United States Patent Office 2,853,513
Patented Sept. 23, 1958

2,853,513

N.N'-BIS-(CARBOXYALKYLTHIOCARBAMYL) POLYMETHYLENEDIAMINES

Arthur Ferguson McKay, Pointe Claire, Quebec, and Edward James Tarlton and Stanley Gelblum, Montreal, Quebec, Canada, assignors to Monsanto Canada Limited, Ville La Salle, Quebec, Canada, a body politic and corporate No Drawing. Application April 22, 1957
Serial No. 654,062

Claims priority, application Great Britain April 24, 1956

4 Claims. (Cl. 260—481)

This invention relates to a new class of compounds of industrial value.

According to a first feature of the invention there are provided N.N'-di-(carboxyalkylthiocarbamyl)polymethylenediamines of the general Formula I.

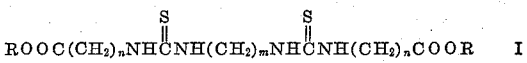

where $n$ is an integer from 3 to 18, $m$ is an integer from 2 to 18, R is hydrogen, an alkyl group containing 1 to 18 carbon atoms or an alkali metal or ammonium radical, and polymers formed from the above formula, where R is hydrogen, on heating in an inert atmosphere.

According to a further feature of the invention compounds of the foregoing Formula I are prepared by reacting a compound of the general Formula II

where M is an atom of an alkali metal or is $NH_4$ with substantially two molecular equivalents of an ω-amino acid of the general Formula III $$H_2N(CH_2)_nCOOH \qquad III$$

thereby to produce a compound of Formula I in which R is an alkali metal atom or ammonium radical and optionally thereafter converting this to a compound in which R is hydrogen or an alkyl group by methods known per se for the conversion of a salt group to a free acid group or an alkyl ester group.

The compound of general Formula II may be obtained by reacting carbon disulphide in the presence of caustic alkali with an alkylene diamine of the Formula IV.

$$NH_2-(CH_2)_m-NH_2 \qquad IV$$

Preferably the intermediate of Formula II is made by adding 2 mol equivalents of carbon disulphide and 2 mol equivalents of caustic alkali (e. g. caustic soda) to a mol equivalent of the alkylene diamine of Formula IV while maintaining the temperature at 20–45° C. and the pH at 9 to 11. It is not necessary to isolate the intermediate and the present invention accordingly includes the method whereby the compound of Formula II is made as set forth above and is reacted in situ with a compound of general Formula III.

In effecting the reaction between compounds of general Formulae II and III hydrogen sulphide is evolved and the reaction is preferably carried out by heating the reactants at or near reflux temperature in aqueous alkaline solution until evolution of hydrogen sulphide ceases.

The free acid may be obtained from the reaction product by acidification, e. g. with hydrochloric acid, followed by filtration of the product. Where $m$ has a value of 2, 3 or 4 a small amount of a cyclic thiourea of the general Formula V.

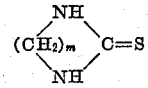

is obtained as a by product.

The corresponding esters (R=alkyl) may be obtained by known methods of ester formation, e. g. by treating with an alkanol in the presence of a catalyst such as sulphuric acid, or aryl sulphonic acid or dry hydrogen chloride. The esters obtained are crystalline solids.

The dithiourea acids (R=H) on prolonged heating above their melting points in an inert atmosphere are converted to hard elastic polymers. Further they may be heated with glycols or polyamines, with or without catalysts to give polyesters and polyamides.

All the various products indicated above have important utility. The free dithiourea acids (R=H) may be converted to the corresponding diurea acids as described in co-pending Application No. 654,061, filed April 22, 1957. The esters (R=alkyl) are suitable as plasticisers in the compounding of high temperature moulding compositions. The polymers ($x$ being a large integer) are suitable for use as high temperature moulding compounds, e. g. for compression or extrusion moulding. The polyesters and polyamides are useful for injection moulding, film formation, fibre formation and sheeting.

The following examples illustrate preferred methods of preparing the invention.

EXAMPLE I

N.N' bis-(ε-carboxypentylthiocarbamyl) ethylenediamine

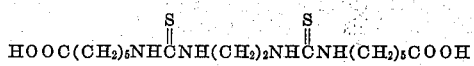

Seventy-six parts of carbon disulphide and 43.2 parts of sodium hydroxide in 45 parts of water were added dropwise over a period of eighty minutes to a stirred solution of 30 parts of ethylenediamine in 90 parts of water. The resulting solution was made up to 500 parts by volume by addition of water and an aliquot (80 parts) was treated with 13.1 parts of ε-aminocaproic acid at ambient temperature. This reaction mixture was refluxed for seven hours. During the reflux period hydrogen sulphide was evolved. The clear solution was cooled to room temperature after which it was acidified to a pH of 1.6 with hydrochloric acid solution. The precipitated solid (17 parts by weight, 83% yield) was removed by filtration and then washed with water. It melted at 128–130° C. Crystallization from aqueous methanol raised the melting point to 129–131° C. This new compound on analysis gave 46.97% carbon, 7.53% hydrogen, 14.01% nitrogen and 16.0% sulphur compared with the theoretical calculated for $C_{16}H_{30}N_4O_4S_2$ of 47.27% carbon, 7.44% hydrogen, 13.78% nitrogen and 15.77% sulphur. Its acid equivalent was 198 compared with the calculated value of 203.27.

EXAMPLE II

N.N' bis-(ε-carboxypentylthiocarbamyl) trimethylenediamine

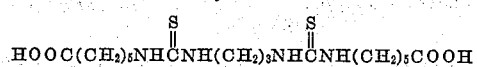

Carbon disulphide (38.1 parts by weight) and 20 parts of sodium hydroxide in 40 parts of water were added dropwise from separatory funnels to 18.53 parts of trimethylenediamine in 50 parts of water at 35° C. After the vigorously stirred reaction mixture became homogeneous it was diluted to 250 parts by volume with water. To an aliquot (50 parts by volume) of this solution was added 13.1 parts by weight of ε-aminocaproic acid in 80 parts of water. This solution was refluxed for seven hours and the evolved hydrogen sulphide was removed in scrubbers. The cooled solution was acidified with 10% hydrochloric acid solution to a pH of <2. At first a viscous oil separated which later solidified to a white solid, yield 23.3 parts (quantitative yield). The melting point (89–91° C.) of this product was increased to a constant value of 107–108° C. by crystallizing from 10% aqueous methanol. This new compound on analysis gave 48.35% carbon, 7.76% hydrogen, 13.52% nitrogen and 16.40% sulphur, compared with the theoretical calculated for $C_{17}H_{32}N_4O_4S_2$ of 48.54% carbon, 7.67% hydrogen, 13.32% nitrogen and 15.25% sulphur. The neutralization equivalent was 213 compared with the calculated value of 210.3.

EXAMPLE III

N.N' bis-(ε-carboxypentylthiocarbamyl) hexamethylenediamine

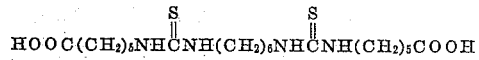

To a stirred solution of 29 parts of hexamethylenediamine in 100 parts of water was added dropwise and simultaneously 38.1 parts of carbon disulphide and 20 parts of sodium hydroxide in 70 parts of water. The temperature of this solution was not allowed to rise above 40° C. This reaction mixture was stirred until it became homogeneous after which it was diluted to 500 parts by volume with water. An aliquot (100 parts by volume) of this solution was treated with 13.1 parts of ε-aminocaproic acid in 80 parts of water. This solution was refluxed for seven hours and the evolved hydrogen sulphide collected in a scrubber system. This solution on acidification to a pH of <2 with 10% hydrochloric acid solution gave 22.9 parts (94.2% yield) of solid which melted at 115–120° C. This material was purified by solution in dilute potassium hydroxide solution. After the solution was filtered it was acidified and the precipitate collected as previously described. The purified material melted at 141–142° C. This new compound on analysis gave 51.60% carbon, 8.18% hydrogen, 12.14% nitrogen and 13.53% sulphur compared with the theoretical calculated for $C_{20}H_{38}N_4O_4S_2$ of 51.91% carbon, 8.28% hydrogen, 2.11% nitrogen and 13.86% sulphur.

EXAMPLE IV

N.N' bis-(γ-carboxypropylthiocarbamyl)hexamethylenediamine

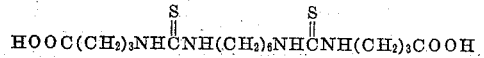

N.N' bis-(γ-carboxypropylthiocarbamyl)hexamethylene-diamine was prepared in 94.6% yield and purified by the same procedure as disclosed above for the preparation of N.N' bis-(ε-carboxypentylthiocarbamyl)hexamethylenediamine in Example III. The crude product melted at 118–126° C. and the pure product melted at 158–159° C. This new compound on analysis gave 47.21% carbon, 7.56% hydrogen, 13.48% nitrogen and 15.44% sulphur as compared with 47.27% carbon, 7.44% hydrogen, 13.78% nitrogen and 15.77% sulphur.

EXAMPLE V

N.N' bis-(ε-carboxypentylthiocarbamyl)tetramethylenediamine

Eighty-seven parts by volume of a solution, containing 0.1 mol of disodium tetramethylene bis-dithiocarbamate, was combined with a solution of ε-aminocaproic acid obtained from 33.5 parts (0.20 mol) of the amino acid hydrochloride and 8.0 parts (0.20 mol) of sodium hydroxide in 100 parts water. The mixture was refluxed for seven hours, cooled, filtered, and the filtrate acidified with 37% hydrochloric acid to pH 2. The resulting precipitate was filtered and dried to give 35.2 parts (81%) of N.N'-bis-(γ-carboxypentylthiocarbamyl)tetramethylene diamine, M. P. 145–150° C. N. E. Calc. for

Found: 226.

The filtrate was evaporated in vacuo to a volume of approximately 100 parts, at which point, crystals began to separate from the solution. The solution was cooled and the crystals were collected to yield 2–31 parts (17.8%) of tetramethylene thiourea, M. P. 174–176° C.

EXAMPLE VI

N.N'-bis-(γ-carboxypropylthiocarbamyl)tetramethylenediamine

A mixture of 27.9 parts (0.20 mol) of γ-amino-butyric acid hydrochloride, 8.0 parts (0.20 mol) of sodium hydroxide and 100 parts of water was combined with 0.10 mol of disodium tetramethylene bisdithiocarbamate in 87.2 parts by volume of aqueous solution. The condensation and subsequent isolation of the produce proceeded as in the previous experiments. The reaction gave 28.0 parts (74%) of N.N'-bis-(γ-carboxypropylthiocarbamyl)-tetramethylenediamine, M. P. 152–154° C. N. E. Calc. for $C_{14}H_{26}N_4O_4S_2$:189. Found: 208. Tetramethylene thiourea was also isolated in 14.3% yield (1.86 parts), as in Example V above.

EXAMPLE VII

Dimethyl ester of N.N'-bis-(γ-carboxypropylthiocarbamyl)-tetramethylenediamine

Two parts of the dithiourea-diacid of Example VI were methylated with 25 parts by volume of methanolic hydrogen chloride at 10° C. overnight. The solution was evaporated to dryness in vacuo at room temperature to yield a crystalline residue. This was recrystallized from acetone pentane at −20° C. to yield 1.36 parts of the diester, M. P. 93–95° C. Dilution of the filtrate with pentane gave an additional 0.54 part, M. P. 90–93° C. The total crude yield was 1.90 parts or 84.5%. The product was purified by recrystallization from methanol water, which yielded 1.03 parts, M. P. 110–117° C. This was dissolved in 20 parts by volume of acetone and filtered through a column containing 30 parts of neutral alumina. The fractions eluted with acetone were combined and evaporated. The residue was recrystallized from acetone to yield 0.48 part, M. P. 122–123. Analysis of this material is given in Table II.

EXAMPLE VIII

Dimethyl ester of N.N'-bis(ε-carboxypentylthiocarbamyl)-hexamethylenediamine

A mixture of 2.0 parts of the dithiourea-diacid of Example III and 25 parts by volume of 1% methanolic hydrogen chloride was shaken for one hour to effect solution. The methylation was allowed to proceed in the cold overnight. The product was isolated and purified as described above to yield 1.72 parts (81.1%) of the ester, M. P. 68–70° C. One recrystallization from acetone hexane gave 1.10 parts, M. P. 78–80° C.

Analysis of this material is given in Table II.

EXAMPLE IX

*Dimyristyl ester of N.N'-bis-(ε-carboxypentylthiocarbamyl) tetramethylenediamine*

$$C_{14}H_{29}OOC(CH_2)_5NHCSNH(CH_2)_4NHCSNH(CH_2)_5COOC_{14}H_{29}$$

A mixture of 5.0 parts (11.5 M mols) of the dithiourea diacid of Example IV and 6.17 parts (28.7 M mols) of myristyl alcohol was heated in a wax bath at 130° C. until the mass became molten. Sulphuric acid (0.25 part) was added and the clear melt was heated under a stream of nitrogen for two hours. It was cooled and the solid residue was triturated with ether. The insoluble ester was collected, washed with ether and dried, to yield 4.16 parts (43.6%), M. P. 105–110° C. The product was dissolved in 100 parts by volume of chloroform and this solution was eluted through a column containing 100 parts of alumina as described above.

Combination and evaporation of the fractions gave a residue which was recrystallized from 25 parts by volume of ethyl acetate to yield 2.77 parts of the dimyristyl ester, M. P. 113–114° C. Analytical results on this material are listed in Table II.

EXAMPLE X

*Dimyristyl ester of N.N'-bis-(ε-carboxypentylthiocarbamyl)-hexamethylenediamine*

A mixture of 5.0 parts (11.5 M mols) of the dithiourea diacid of Example III and 5.74 parts (26.8 M mols) of myristyl alcohol was heated in a wax bath at 130° C. When the mass melted, 0.2 part of sulphuric acid was added and the temperature of the reaction mixture was maintained at 130° C. for two hours, while maintaining a stream of nitrogen. The mixture was evolved and the residue was triturated with ether. The insoluble ester was collected and dried to yield 3.55 parts (38.4%), M. P. 89–95° C. The product was purified by chromatography on alumina as described above. Recrystallization from 25 parts of volume of ethyl acetate gave 2.12 parts, M. P. 97–98° C. Analytical results are listed in Table II.

EXAMPLE XI

*Pyrolysis of N.N'-bis-(ε-carboxypentylthiocarbamyl) tetramethylene diamine*

6.32 parts of the dithiourea diacid of Example V were heated for 6 hours in vacuo under nitrogen to a maximum temperature of 270° C. The polymer was light brown, hard and very elastic, melting about 310° C. 5.20 parts of polymer were obtained, corresponding to a yield of 83%.

EXAMPLE XII

*Pyrolysis of N.N'-bis-(ε-carboxypentylthiocarbamyl) trimethylenediamine*

6.28 grams of the dithiourea diacid of Example II were heated in an atmosphere of nitrogen at 1–2 mm. Hg pressure for 14 hours, at a gradually increasing temperature up to a maximum of 270°. 3.31 parts of light brown fairly brittle polymer were obtained, melting at 155–157° C.

TABLE I.—N.N'-BIS-(ω-CARBOXYALKYLTHIOCARBAMYL) ALKYLENEDIAMINES HOOC(CH₂)ₙNHCSNH(CH₂)ₘNHCSNH(CH₂)ₙCOOH

| n | m | M. P., °C. | Yield, percent | Formula | C Calcd. | C Found | H Calcd. | H Found | N Calcd. | N Found | S Calcd. | S Found |
|---|---|---|---|---|---|---|---|---|---|---|---|---|
| 3 | 2 | 161–162 | 55.5 | C₁₂H₂₂N₄O₄S₂ | 41.12 | 41.28 | 6.33 | 6.43 | 15.99 | 16.30 | 18.30 | 17.72 |
| 5 | 2 | 133–134 | 72.5 | C₁₆H₃₀N₄O₄S₂ | 47.27 | 46.91 | 7.44 | 7.53 | 13.78 | 14.01 | 15.77 | 16.00 |
| 3 | 3 | 128–130 | 61.8 | C₁₃H₂₄N₄O₄S₂ | 42.84 | 42.08 | 6.64 | 6.42 | 15.37 | 15.45 | 17.59 | 17.66 |
| 5 | 3 | 132–133 | 82.1 | C₁₇H₃₂N₄O₄S₂ | 48.54 | 48.16 | 7.67 | 7.81 | 13.32 | 13.11 | 15.25 | 15.16 |
| 3 | 4 | 153–154 | 74.0 | C₁₄H₂₆N₄O₄S₂ | 44.42 | 44.26 | 6.93 | 7.85 | 14.80 | 15.13 | 16.94 | 16.97 |
| 5 | 4 | 149–152 | 81.0 | C₁₈H₃₄N₄O₄S₂ | 49.74 | 49.55 | 7.89 | 8.54 | 12.89 | 13.32 | 14.76 | 14.98 |
| 3 | 5 | 138–140 | 65.4 | C₁₅H₂₈N₄O₄S₂ | 45.89 | 45.88 | 7.19 | 7.06 | 14.27 | 14.35 | 16.34 | 16.00 |
| 5 | 5 | 126.5–128 | 84.4 | C₁₉H₃₆N₄O₄S₂ | 50.86 | 50.75 | 8.09 | 8.19 | 12.49 | 12.94 | 14.29 | 14.38 |
| 3 | 6 | 158–159 | 58.0 | C₁₆H₃₀N₄O₄S₂ | 47.27 | 47.21 | 7.44 | 7.56 | 13.78 | 13.48 | 15.77 | 15.44 |
| 5 | 6 | 144–145 | 75.1 | C₂₀H₃₈N₄O₄S₂ | 51.91 | 52.08 | 8.28 | 8.46 | 12.11 | 12.13 | 13.86 | 13.73 |

TABLE II.—ESTERS OF N.N'-BIS-(ω-CARBOXYALKYLCARBAMYL) ALKYLENEDIAMINES ROOC(CH₂)ₙNHCSNH(CH₂)ₘNHCSNH(CH₂)ₙCOOR

| R | m | n | Yield, percent | M. P., °C. | Formula | C Calc. | C Found | H Calc. | H Found | N Calc. | N Found | S Calc. | S Found |
|---|---|---|---|---|---|---|---|---|---|---|---|---|---|
| CH₃ | 3 | 2 | 50.9 | 117–118 | C₁₄H₂₆N₄O₄S₂ | 44.42 | 45.09 | 6.92 | 6.82 | 14.80 | 14.60 | 16.94 | 17.09 |
| CH₃ | 5 | 3 | 34.1 | 103–105 | C₁₉H₃₆N₄O₄S₂ | 50.86 | 51.14 | 8.08 | 8.01 | 12.48 | 12.28 | 14.29 | 13.90 |
| CH₃ | 3 | 4 | 84.5 | 122–123 | C₁₆H₃₀N₄O₄S₂ | 47.26 | 47.47 | 7.43 | 7.36 | 13.78 | 13.44 | 15.77 | 15.91 |
| CH₃ | 5 | 4 | 31.0 | 122–123 | C₂₀H₃₈N₄O₄S₂ | 51.91 | 51.65 | 8.27 | 8.25 | 12.11 | 12.10 | 13.85 | 13.71 |
| n-C₁₄H₂₉ | 5 | 4 | 43.6 | 113–114 | C₄₆H₉₀N₄O₄S₂ | 66.77 | 66.89 | 10.96 | 10.96 | 6.77 | 6.64 | 7.75 | 7.83 |
| CH₃ | 3 | 6 | 29.5 | 73–74 | C₁₈H₃₄N₄O₄S₂ | 49.74 | 49.74 | 7.88 | 7.90 | 12.89 | 12.98 | 14.76 | 14.77 |
| CH₃ | 5 | 6 | 81.1 | 79–80 | C₂₂H₄₂N₄O₄S₂ | 53.84 | 53.69 | 8.62 | 8.64 | 11.42 | 12.06 | 13.06 | 12.68 |
| n-C₁₄H₂₉ | 5 | 6 | 38.4 | 97–98 | C₄₈H₉₄N₄O₄S₂ | 67.40 | 66.76 | 22.07 | 10.77 | 6.55 | 6.79 | 7.49 | 7.91 |

We claim:

1. A process for the production of a compound of the general formula $$HOOC(CH_2)_n NH\overset{S}{\underset{\|}{C}} NH(CH_2)_m NH\overset{S}{\underset{\|}{C}} NH(CH_2)_n COOH$$

where n is an integer from 3 to 5, m is an integer from 2 to 6, which comprises reacting a compound of the general formula $$M-S-\overset{S}{\underset{\|}{C}}-NH(CH_2)_m NH-\overset{S}{\underset{\|}{C}}-S-M$$

where M is an atom of an alkali metal in aqueous solution at a pH between 9 and 11, with substantially two molecular equivalents of an ω-amino acid of the general formula $$H_2N(CH_2)_n COOH$$

then acidifying the resulting solution.

2. A process as defined in claim 1 wherein the reaction with ω-amino acid is effected by heating the reactants in an aqueous alkaline solution at about reflux temperature until evolution of hydrogen sulphide ceases and subsequently acidifying to precipitate the compound of claim 1.

3. A process according to claim 1 wherein the reaction with the ω-amino acid is effected by heating the reactants in an aqueous alkaline solution at about reflux temperature until evolution of hydrogen sulphide ceases.

4. A process as defined in claim 1 in which the acid formed is treated with an alcohol having 1 to 18 carbon atoms in the presence of an acid esterifying agent.

References Cited in the file of this patent

UNITED STATES PATENTS 2,356,702    Schlack  ---------------- Aug. 22, 1944

FOREIGN PATENTS 527,335    Canada  ------------------ July 3, 1956